Figure 1:
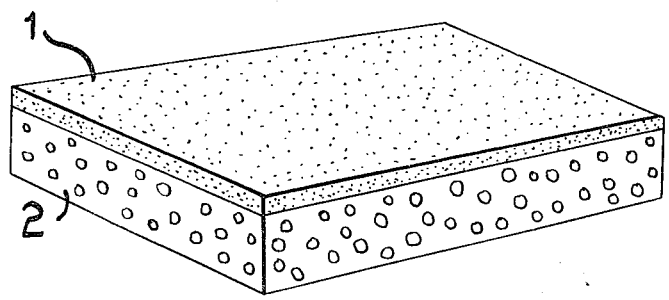

United States Patent
Christenson et al.

[15] 3,663,398
[45] May 16, 1972

[54] ION EXCHANGE OF AN ULTRAFILTRATE DERIVED FROM AN ELECTRODEPOSITION BATH

[72] Inventors: Roger M. Christenson, Gibsonia; Robert R. Zwack, New Kensington, both of Pa.

[73] Assignee: PPG Industries, Inc., Pittsburgh, Pa.

[22] Filed: Sept. 14, 1970

[21] Appl. No.: 71,984

Related U.S. Application Data

[63] Continuation-in-part of Ser. No. 879,769, Nov. 25, 1969, abandoned.

[52] U.S. Cl. ................................................204/181
[51] Int. Cl. .................................B01k 5/02, C23b 13/00
[58] Field of Search ............................................204/181

[56] References Cited

UNITED STATES PATENTS

| | | |
|---|---|---|
| 3,355,373 | 11/1967 | Brewer et al............................204/181 |
| 3,556,970 | 1/1971 | Wallace et al..........................204/181 |
| 3,528,901 | 9/1970 | Wallace et al..........................204/181 |

FOREIGN PATENTS OR APPLICATIONS 1,071,458   6/1967   Great Britain........................204/181

OTHER PUBLICATIONS

Michaels, New Separation Technique for the CPI, Chem. Engineering Progress (1968).

*Primary Examiner*—Howard S. Williams
*Attorney*—Chisholm and Spencer

[57] ABSTRACT

This invention relates to a method of treating and controlling the composition of electrodeposition baths. The process of the invention comprises ultrafiltration in combination with ion exchange of the filtrate derived from the ultrafiltration process.

20 Claims, 3 Drawing Figures

Patented May 16, 1972

3,663,398

2 Sheets-Sheet 1

INVENTORS
ROGER M. CHRISTENSON
ROBERT R. ZWACK

BY

ATTORNEYS

INVENTORS
ROGER M. CHRISTENSON
ROBERT R. ZWACK

ATTORNEYS

3,663,398

ION EXCHANGE OF AN ULTRAFILTRATE DERIVED FROM AN ELECTRODEPOSITION BATH

CROSS-REFERENCE TO RELATED APPLICATIONS

This application is a Continuation-in-Part of copending U. S. Application Ser. No. 879,769, filed Nov. 25, 1969 now abandoned.

STATE OF THE ART

Electrodeposition has become a widely commercially accepted industrial coating technique. The coatings achieved have excellent properties for many applications and electrodeposition results in a coating which does not run or wash off during baking. Virtually any conductive substrate may be coated by electrodeposition. Those normally employed are metal substrates, including metals such as iron, steel, copper, zinc, brass, tin, nickel, chromium and aluminum, as well as other metals and pretreated metals. Impregnated paper and other substrates rendered conductive under the conditions of the coating process may also be employed as substrates.

In the electrodeposition process, the articles to be electrocoated are immersed in an aqueous dispersion of solubilized, ionized, film-forming materials such as synthetic organic vehicle resin. An electric current is passed between the article to be coated, serving as an electrode, and a counter electrode to cause deposition of a coating of the vehicle resin on the article. The article is then withdrawn from the bath, usually rinsed and then the coating either air dried or baked in the manner of a conventional finish.

A major problem in the continuous electrodeposition process has been the control of the electrodeposition bath to maintain initial bath properties. The solubilized electrodepositable vehicle resin may be characterized as a polyelectrolyte, that is, a polyacid or a polybase solubilized by a water soluble base in the first instance and a water soluble acid in the second instance. When the vehicle resin is coated upon an article serving as an anode in the case of the polyacid and the cathode in the case of a polybase, there remains in the solution a counter-ion, which is the base or acid used to solubilize the resin. The control or removal of excess counter-ion has been attacked by many means. These include circulating the bath through an ion-exchange resin, using a counter-ion deficient feed stock which will scavenge excess counter-ions, circulating the bath through a dialysis unit, concentrating the counter-ion in an electrodialysis cell formed by surrounding the electrode with a semi-permeable membrane and the use of a vapor-liquid separation process.

While these counter-ion control means have permitted continuous bath operations, it has been seen that it remains extremely difficult to control operating tanks to contain their initial paint properties. Almost without exception, the tank never has better properties than the day it is filled and from that time on, efforts must be directed toward minimizing loss of coating properties. It has been found that as tanks operate, chemicals from various sources tend to accumulate in the electrodeposition tank. The most probable sources of the contamination are the chemicals on the object to be painted, water added to the tank, or chemicals absorbed from the air or from the paint itself. Regardless of the technique employed to remove counter-ions and some other objectionable ions, the deterioration of film properties has been frequently encountered.

In copending Application Ser. No. 814,789, filed Apr. 9, 1969, there is disclosed a method of controlling the composition of electrodeposition baths by an ultrafiltration process. In the ultrafiltration process, excellent control of the bath composition and removal of objectional accumulated materials has been achieved by a selective filtration process, that is, a process which selectively removes low molecular weight materials from the bath composition. This selective filtration process removes excess counter-ions and thus serves as a method of conventional bath control; but, in addition, this method removes other excess materials and/or contaminants from the bath, thus permitting fewer bath constituents than had heretofore been possible.

DESCRIPTION OF THE INVENTION

It has been found that further economies in the electrodeposition process, as well as greater flexibility in the operation of the electrodeposition process are achieved by passing the effluent filtrate from the ultrafiltration process (this filtrate hereinafter being referred to as the ultrafiltrate) through an ion-exchange media, thereby removing at least a portion of objectionable ions from the ultrafiltrate. The process is extremely useful in removing excess counter ions. Carbonate ions, for example, dissolved carbon dioxide, may likewise be removed even when cationic exchange is employed. The resultant liquid with ions removed in whole or in part may be utilized in various manners; for example, it may be used to rinse dragout from electrodeposited parts, either in a manner that the dragout-containing rinse is returned to the electrodeposition bath or in a manner that the rinse water is collected separate from the bath; the effluent may be returned to the electrodeposition bath, or may be treated as waste material from which an additional objectionable substance has been removed.

The process of the invention has advantages over either ultrafiltration or ion exchange alone and allows for great flexibility in bath control. By returning ion-exchanged ultrafiltrate to the bath, as rinsing media or otherwise, ion control is achieved without loss of valuable low molecular weight species such as organic solvent and desirable low molecular weight modifiers which may be lost in ultrafiltration. Likewise, as opposed to ion exchange, in addition to ions other than non-ionic, objectionable low molecular weight species may be removed if desired and ion removal is accomplished without the ion exchange media coming in contact with the vehicle resin. This is an important factor since the efficacy of an ion-exchange media in controlling an electrodeposition process has always been severely hampered by the presence of the vehicle resin and other pigments and other components which coat or deposit onto or clog the ion exchange media in time. Thus, the process of the invention uniquely combines the advantages of both systems while avoiding the chief detriment to effective ion exchange in an electrodeposition bath. One aspect of the invention further provides a means of rinsing to conserve dragout thus providing even greater economies of material use. The process of this invention is also highly advantageous since it reduces environmental pollution resulting from the total electrodeposition process.

As described in copending Application Ser. No. 814,789, filed Apr. 9, 1969, the ultrafiltration process is a selective filtration process which separates materials below a given molecular weight size from the electrodeposition bath. With properly selected membranes this treatment does not remove any product or desirable resin from the paint in the tank but does remove anionic, cationic and non-ionic materials from the paint in a ratio proportional to their concentration in the water phase of the paint. Thus, for example, it is possible to remove amines, alkaline metal ions, phosphates, chromates, sulfates, solvents and dissolved carbon dioxide, among others.

Ultrafiltration may be defined as a method of concentrating solute while removing solvent, or selectively removing solvent and low-molecular weight solute from a significantly higher molecular weight solute. From another aspect, it is a process of separation whereby a solution containing a solute of molecular dimensions significantly greater than the solvent is depleted of solute by being forced under a hydraulic pressure gradient to flow through a suitable membrane. The first definition is the one which most fittingly describes the term "ultrafiltration" as applied to an electrodeposition bath.

Ultrafiltration thus encompasses all membrane-moderated, pressure-activated separations wherein solvent or solvent and smaller molecules are separated from modest molecular weight macromolecules and colloids. The term "ultrafiltration" is generally broadly limited to describing separations involving solutes of molecular dimensions greater than about 10 solvent molecular diameters and below the limit of resolution of the optical microscope, that is, about 0.5 micron. In the present process water is considered the solvent.

The principles of ultrafiltration and filters are discussed in a chapter entitled "Ultrafiltration" in the Spring, 1968, volume of ADVANCES IN SEPARATIONS AND PURIFICATIONS, E. S. Perry, Editor, John Wiley & Sons, New York, as well as in CHEMICAL ENGINEERING PROGRESS, Vol. 64, December 1968, pages 31 through 43, which are hereby incorporated by reference.

The basic ultrafiltration process is relatively simple. Solution to be ultrafiltered is confined under pressure, utilizing, for example, either a compressed gas or liquid pump in a cell, in contact with an appropriate filtration membrane supported on a porous support. Any membrane or filter having chemical integrity to the system being separated and having the desired separation characteristic may be employed. Preferably, the contents of the cell should be subjected to at least moderate agitation to avoid accumulation of the retained solute on the membrane surface with the attendant binding of the membrane. Ultrafiltrate is continually produced and collected until the retained solute concentration in the cell solution reaches the desired level, or the desired amount of solvent or solvent plus dissolved low molecular weight solute is removed. A suitable apparatus for conducting ultrafiltration is described in U. S. Pat. No. 3,494,465, which is hereby incorporated by reference.

There are two types of ultrafiltration membrane. One is the microporous ultrafilter, which is a filter in the traditional sense, that is, a rigid, highly voided structure containing interconnected random pores of extremely small average size. Through such a structure, solvent (in the case of electrodeposition, water) flows essentially viscously under a hydraulic pressure gradient, the flow rate proportional to the pressure difference, dissolved solutes, to the extent that their hydrated molecule dimensions are smaller than the smallest pores within the structure, will pass through, little impeded by the matrix. Larger size molecules, on the other hand, will become trapped therein or upon the external surface of the membrane and will thereby be retained. Since the microporous ultrafilters are inherently susceptible to internal plugging or fouling by solute molecules whose dimensions lie within the pore size distribution of the filter, it is preferred to employ for a specific solute a microporous ultrafilter whose mean pore size is significantly smaller than the dimensions of the solute particle being retained.

In contrast, the diffusive ultrafilter is a gel membrane through which both solvent and solutes are transported by molecular diffusion under the action of a concentration or activity gradient. In such a structure, solute and solvent migration occurs via random thermal movements of molecules within and between the chain segments comprising the polymer network. Membranes prepared from highly hydrophilic polymers which swell to eliminate standard water are the most useful diffusive aqueous ultrafiltration membrane. Since a diffusive ultrafilter contains no pores in the conventional sense and since concentration within the membrane of any solute retained by the membrane is low and time-independent, such a filter is not plugged by retained solute, that is, there is no decline in solvent permeability with time at a constant pressure. This property is particularly important for a continuous concentration or separation operation. Both types of filters are known in the art.

The presently preferred ultrafilter is an anisotropic membrane structure such as illustrated in FIG. 1. This structure consists of an extremely thin, about one-tenth to about 10 micron layer, of a homogeneous polymer 1 supported upon a thicker layer of a microporous open-celled sponge 2, that is, a layer of about 20 microns to about 1 millimeter, although this dimension is not critical. If desired, this membrane can be further supported by a fibrous sheet, for example, paper, to provide greater strength and durability. These membranes are used with a thin film or skin side exposed to the high pressure solution. The support provided to the skin by the spongy substrate is adequate to prevent film rupture.

Membranes useful in the process are items of commerce and can be obtained by several methods. One general method is described in Belgian Pat. No. 721,058. This patent describes a process which, in summary, comprises (a) forming a casting dope of the polymer in an organic solvent, (b) forming a film of the casting dope, and (c) preferentially contacting one side of said film with a diluent having high compatibility with the casting dope to effect precipitation of the polymer immediately upon coating the cast film with the diluent.

The choice of a specific chemical composition for the membrane is determined to a large extent by its resistance to the chemical environment. Membranes can be typically prepared from thermoplastic polymers such as polyvinyl chloride, polyacrylonitrile, polysulfones, poly(methyl methacrylate), polycarbonates, poly(n-butyl methacrylate), nylons, as well as a large group of copolymers formed from any of the monomeric units of the above polymers, including "Polymer 360," a polysulfone copolymer. Cellulosic materials such as cellulose acetate may also be employed as membrane polymers.

Some examples of specific anisotropic membranes operable in the process of the invention include: Diaflow membrane ultrafilter PM-30, the membrane chemical composition of which is a polysulfone copolymer, Polymer 360, and which has the following permeability characteristics:

Solute Retention Characteristics

| Solute | Molecular Weight | % Retention |
| --- | --- | --- |
| Bacitracin | 1,400 | 0 |
| Cytochrome C | 14,500 | 0 |
| Pepsin | 35,000 | 100 |
| Albumin | 67,000 | 100 |
| Dextran 110 | 110,000 | 60 |

Flow Rate—ml./min.

| Membrane Diameter | Pressure P.S.I. | Distilled Water | 0.25% Cytochrome C (~12,400 mw) in Distilled Water | 0.25% Pepsin (~35,000 mw) in Distilled Water |
| --- | --- | --- | --- | --- |
| 25 mm. | 50 | 15 | 0.5 | 1.5 |
| 150 mm. | 50 | 600 | 24.0 | 80.0 |

The membrane is chemically resistant to acids HCl, $H_2SO_4$, $H_3PO_4$, all concentrates), alkalis, high phosphate buffer and solutions of common salts as well as concentrated urea and guanadine hydrochloride. The membrane is solvent-resistant to alcohol, acetone and dioxane. The membrane is not solvent-resistant to dimethylformamide or dimethyl sulfoxide. This membrane is hereinafter referred to as "Membrane A."

Dorr-Oliver XPA membrane, the membrane chemical composition of which is Dynel (an acrylonitrile-vinyl chloride copolymer) and which has the following permeability characteristics:

| Solute | Molecular weight | Percent retention | Flux (gal./sq.ft./day at 30 psi, 1.0% solute) |
| --- | --- | --- | --- |
| Cytochrome C | 12,000 | 50 | 100 |
| αChymotrypsinagen | 24,000 | 90 | 22 |
| Ovalbumin | 45,000 | 100 | 45 |

This membrane is hereinafter referred to as "Membrane B."

Dorr-Oliver BPA type membrane, the membrane chemical composition of which is phenoxy resin (polyhydroxy ether) and which has the following permeability characteristics:

| Solute | Molecular weight | Percent retention | Flux (gal./sq.ft./day at 30 psi, 1.0% solute) |
| --- | --- | --- | --- |
| Cytochrome C | 12,600 | 50 | 30 |

This membrane is hereinafter referred to as "Membrane C."

Figure 2:
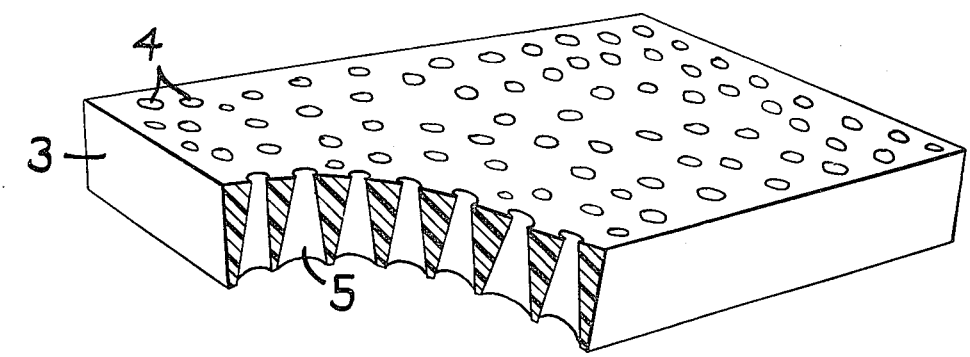

The microporous ultrafilters are generally isotropic structures, thus flow and retention properties are independent of flow direction. It is preferred to use an ultrafilter which is anisotropic in its microporous membrane structure, FIG. 2. In such a membrane, the pore size increases rapidly from one face to the other. When the fine textured side 4 is used in contact with the feed solution, this filter is less susceptible to plugging since a particle which penetrates the topmost layer cannot become trapped in the membrane because of the larger pore size 5 in the substrate.

The process of the invention may be operated as either a batch or a continuous process. In batch selective filtration or batch ultrafiltration, a finite amount of material is placed in a cell which is pressurized. A solvent and lower molecular weight solutes are passed through the membrane. Agitation is provided by a stirrer, for example, a magnetic stirrer. Obviously, this system is best used for small batches of material. In a process requiring continuous separation, a continuous selective filtration process is preferred. Using this technique, material is continuously recirculated under pressure against a membrane or series of membranes through interconnecting flow channels, for example, spiral flow channels.

Likewise, the ultrafiltration process may be conducted as either a concentration process or a diafiltration process. Concentration involves removing solvent and low molecular weight solute from an increasingly concentrated retentate. Filtration flow rate will decrease as the viscosity of the concentrate increases. Diafiltration, on the other hand, is a constant volume process whereby the starting material is connected to a reservoir of pure solvent, both of which are placed under pressure simultaneously. Once filtration begins, the pressure source is shut off in the filtration cell and, thus, as the filtrate is removed, an equal volume of new solvent is introduced into the filtration cell to maintain the pressure balance.

The configuration of the filter may vary widely and is not limiting to the operation of the process. The filter or membrane may, for example, be in the form of a sheet, tubes or hollow fiber bundles, among other configurations.

Under ideal conditions, selected low molecular weight solutes would be filtered as readily as solvent and their concentration in the filtrate is equal to that in the retentate. Thus, for example, if a material is concentrated to equal volumes of filtrate and retentate, the concentration of low molecular weight solute in each would be the same.

Using diafiltration, retentate solute concentration is not constant and the mathematical relationship is as follows:

$$\ln \frac{C_{io}}{C_i} = \frac{V_s}{V_o}$$

where $C_{io}$ is the initial solute concentration, $C_i$ is the final solute concentration of the retentate, $V_s$ is the volume of solute delivered to the cell (or the volume of the filtrate collected), and $V_o$ is the initial solution volume (which remains constant).

Electrodepositable compositions, while referred to as "solubilized," in fact are considered a complex solution, dispersion or suspension or combination of one or more of these classes in water, which acts as an electrolyte under the influence of an electric current. While, no doubt, in some circumstances the vehicle resin is in solution, it is clear that in some instances and perhaps in most the vehicle resin is a dispersion which may be called a molecular dispersion of molecular size between a colloidal suspension and a true solution.

The typical industrial electrodepositable composition also contains pigments, crosslinking resins and other adjuvants which are frequently combined with the vehicle resin in a chemical and a physical relationship. For example, the pigments are usually ground in a resin medium and are thus "wetted" with the vehicle resin. As can be readily appreciated then, an electrodepositable composition is complex in terms of the freedom or availability with respect to removal of a component or in terms of the apparent molecular size of a given vehicle component.

As applied to the process of this invention, ultrafiltration comprises subjecting an electrodepositable composition, especially after it has been employed in a coating process, which inherently causes contaminants and other low molecular weight materials to accumulate in the bath, such as metal pretreatment chemicals, water, absorbed $CO_2$ (either dissolved or, more likely, combined as an aminic salt or carbonate), neutralizing agent, organic solvent and ions such as chromate, phosphate, chloride and sulfate, for example, to an ultrafiltration process employing an ultrafilter, preferably a diffusive membrane ultrafilter selected to retain the solubilized vehicle resin while passing water and low molecular weight solute, especially those with a molecular weight of below about 500. As previously indicated, the filters discriminate as to molecular size rather than actual molecular weight, thus, these molecule weights merely establish an order of magnitude rather than a distinct molecular weight cut-off. Likewise, as previously indicated, the retained solutes may, in fact, be colloidal dispersions or molecular dispersions rather than true solutes.

In practice, a portion of the electrodepositable composition may be continuously or intermittently removed from the electrodeposition bath and passed under pressure created by a pressurized gas or by means of pressure applied to the contained fluid in contact with the ultrafilter. Obviously, if desired, the egress side of the filter may be maintained at a reduced pressure to create the pressure difference.

The pressures necessary are not severe. The maximum pressure, in part, depends on the strength of the filter. The minimum pressure is that pressure required to force water and low molecular weight solute through the filter at a measurable rate. With the presently preferred membranes, the operating pressures are between about 10 and 150 p.s.i., preferably between about 25 and 75 p.s.i. Under most circumstances, the ultrafilter should have an initial flux rate, measured with the composition to be treated of at least about 3 gallons/ft.$^2$/day (24 hours) and preferably at least about 4.5 gallons/ft.$^2$/day.

As previously indicated, the bath composition should be in motion at the face of the filter to prevent the retained solute from impeding the flow through the filter. This may be accomplished by mechanized stirring or by fluid flow with a force vector parallel to the filter surface.

The retained solutes comprising the vehicle resin are then returned to the electrodeposition bath. If desired, the concentrate may be reconstituted by the addition of water either before entry to the bath or by adding water directly to the bath.

If there is present in the bath desirable materials which, because of their molecular size, are removed in the ultrafiltration process, these may likewise be returned to the bath either directly to the retained solute before entry to the bath, in the makeup feed as required, or independently.

For example, where the solubilized electrode-positable resin is a polyacid solubilized with a base, the pH can be reduced and cations can be removed from the aqueous ultrafiltrate by contacting the ultrafiltrate with a cation exchange resin in the hydrogen form. The time of contact is controlled so as to maintain the pH of the ultrafiltrate at the desired level, generally within a range of 2 to 5.

The desired pH level, the rate at which the ultrafiltrate is treated and the actual time of contact to be maintained between the ultrafiltrate and the ion-exchange resin all vary with several factors, including type of ion exchange resin employed and nature of the cations and the desired end use of the resultant filtrate; however, the pH can be easily and continuously monitored during the treatment and thus maintain the desired level.

Any type of cation exchange resin can be employed as long as the composition contacted can be made to acquire the desired pH within any reasonable time. The scope of cation exchange resins which may be employed is substantially larger than that which can be employed in directly contacting the electrodeposition bath composition since the stability of the coating composition in contact with the ion exchange resin is of no moment. It is preferred to use a cation exchange resin having carboxylic acid groups as functional sites. Examples of the weak carboxylic acid type resins commercially available which are preferred are "Amberlyte IRC–50" and "Ionac C–270". Strong ion exchange resins such as sulfonic acid type cation exchange resins may also be employed where relatively short contact times are desired. The use of strong exchange resins in the past has been difficult since in contact with the resin of the bath stability problems were common.

In the case of an ionically solubilized polybasic resin, the ion exchange medium which may be employed is virtually any anion exchange resin which, when contacted with the ultrafiltrate, causes the ultrafiltrate to acquire the desired pH within any reasonable time. The presently preferred anion exchange resins are weak polyamine type resins such as phenolic polyamine resins. Commercially available polyamine resins include "Duolite A-7," "Amberlyte IR–4B," and "Amberlyte IR–45."Strong anion exchange resins include quaternary ammonium group containing resins such as "Amberlyte IRA–410," after conversion to the hydroxyl form.

The treatment may be carried out either on a batch basis or a continuous basis in concurrent or intermittent operation with the ultrafiltration process utilized in controlling the electrodeposition bath. In the batch operation, an ultrafiltrate composition which has too high a pH and an excess of cations is easily treated by mixing and stirring the cation exchange resin with the ultrafiltrate for the desired time and separating the resin from the composition.

In a continuous process, a portion of the ultrafiltrate is contacted with the ion exchange resin and returned to the electrodeposition bath, either directly or after it has been utilized to rinse dragout. Alternatively, the product of the separation can be treated as waste material. The rate of withdrawal may be correlated with the rate at which ions are being formed in the electrodeposition process and the rate at which additional quantities of coating composition are added to the bath. The time of contact, and thus the pH of the resultant composition are regulated by adjusting the rate of input and return and the length of the resin bed through which the ultrafiltrate is passed, or the ratio of ultrafiltrate to ion exchange resin in a batch ion exchange.

In either case, regeneration of the ion exchange resin is easily accomplished by washing, first with water and then with dilute acids, for example, 5 percent aqueous hydrochloric acid in the case of cation exchange resins and appropriate bases in the case of anion exchange resins.

In a continuous operation, it is desired to utilize two or more columns containing ion exchange resin so a fresh column is immediately available at all times.

Figure 3:
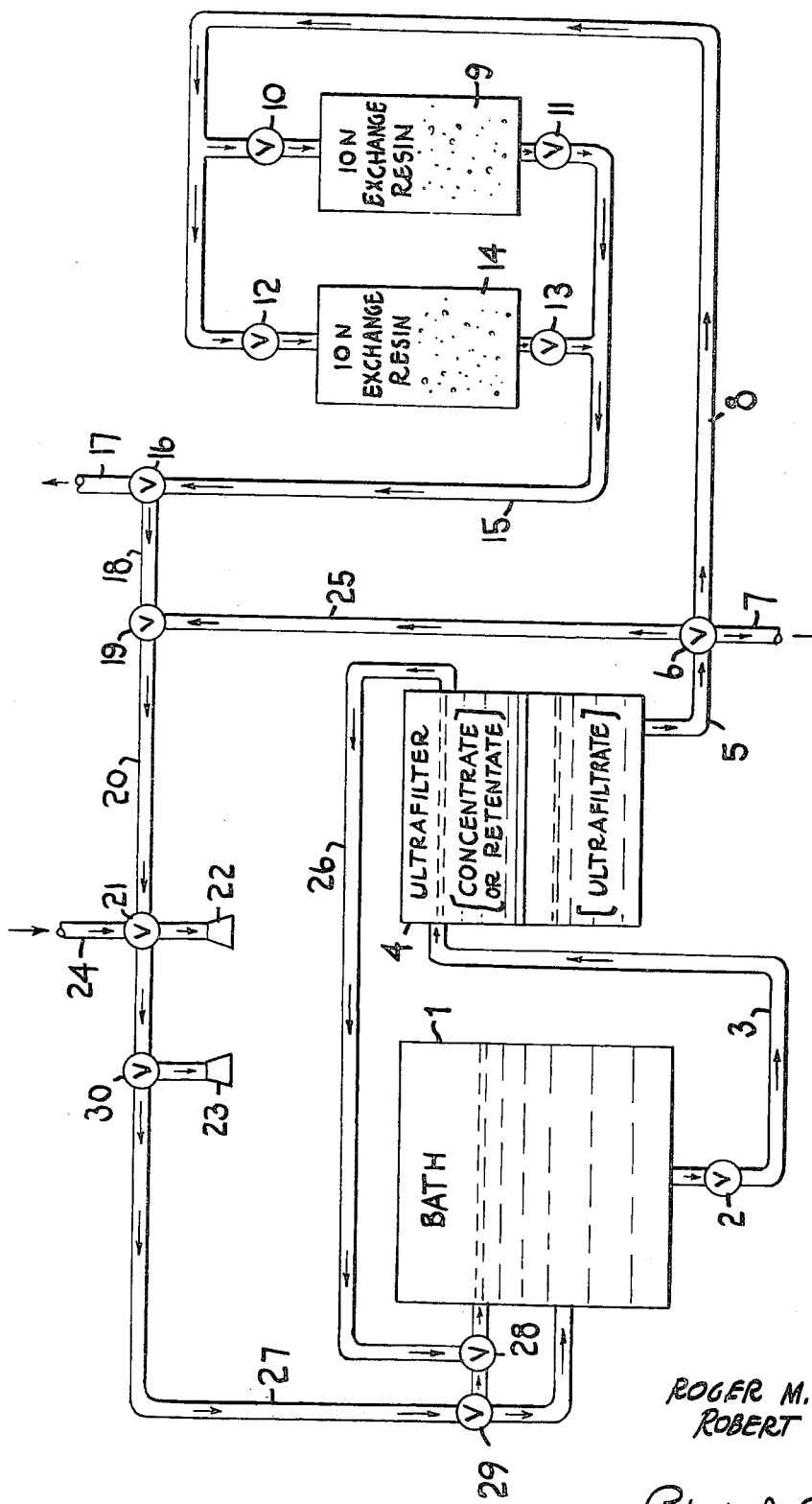

In the attached drawing (FIG. 3), an apparatus used to carry out the method of the invention is schematically illustrated. The electrodeposition bath 1 contains an aqueous electrodepositable composition from which films are deposited using suitable apparatus (not shown). A portion of the bath may be continuously or intermittently withdrawn through an outlet and valve 2 and passed through a line 3 to an ultrafilter 4. Here, in the ultrafiltration process, water, excess counterions, and other low molecular weight species, if present, are separated from the resin, as well as pigment and other higher molecular weight components which may be present in the bath composition. The concentrate or retentate may be returned to the bath through line 26 and valve 28. The ultrafiltrate is removed from the ultrafilter, passing through line 5.

Through the use of a valve 6, the ultrafiltrate may be directed either unidirectionally or proportionally in either an intermittent or continuous fashion to drain 7, for use as rinse material through line 25 or to the ion exchange media through line 8. The ultrafiltrate is then passed through an ion exchange column 9 by opening valves 10 and 11 and closing valves 12 and 13. After the exchange capacity of column 9 has been depleted, the bath composition is passed through ion exchange column 14 by closing valves 10 and 11 and opening valves 12 and 13. Column 9 is then disconnected from the system and the resin regenerated. The column is then replaced in the system. By alternating columns in this manner, the exchange treatment may be carried out continuously. The resultant filtrate from the ion exchange columns is passed through line 15 to valve 16, where it is directed either unidirectionally or proportionally to drain 17 or through the lines 18 and 20 to either a rinse station for rinsing dragout in such a manner that the rinse containing dragout is returned to the bath 23 or rinsing dragout in a manner 22 so that it does not return directly to the bath Alternatively, the effluent and/or ultrafiltrate may be passed either directionally or proportionally directly back into the bath through line 27 and valve 29 or in conjunction with the concentrate or retentate through valves 28 and 29. As stated, this drawing is schematic and does not purport to show pumping means and apparatus which are known in the art. Likewise various other alternatives in the flow system are within the skill of the art.

A number of electrodepositable resins are known and can be employed to provide the electrodepositable compositions which may be utilized within the scope of this invention. Virtually any water-soluble, water-dispersible or water-emulsifiable polyacid or polybasic resinous material can be electrodeposited and, if film-forming, provides coatings which may be suitable for certain purposes. Any such electrodepositable composition is included among those which can be employed in the present invention, even though the coating obtained might not be entirely satisfactory for certain specialized uses.

Presently, the most widely used electrodeposition vehicle resins are synthetic polycarboxylic acid resinous materials. Numerous such resins are described in U. S. Pats. Nos. 3,441,489; 3,422,044; 3,403,088; 3,369,983; and 3,366,563, which are incorporated by reference. These include a reaction product or adduct of the drying oil or semi-drying oil fatty acid ester with a dicarboxylic acid or anhydride. By drying oil or semi-drying oil fatty acid esters are meant esters of fatty acids which are or can be derived from drying oils or semi-drying oils, or from such sources as tall oil. Such fatty acids are characterized by containing at least a portion of polyunsaturated fatty acids. Preferably, the drying oil or semi-drying oil per se is employed.

Also included among such esters are those in which the esters themselves are modified with other acids, including saturated, unsaturated or aromatic acids or an anhydride thereof. The acid-modified esters are made by transesterification of the ester, as by forming a di- or monoglyceride by alcoholysis, followed by esterification with the acid; they may also be obtained by reacting oil acids with a polyol and reacting the acid with the partial ester. In addition to glycerol, alcoholysis can be carried out using the other polyols such as trimethylolpropane, pentaerythritol, sorbitol and the like. If desired, the esters can also be modified with monomers such as cyclopentadiene or styrene and the modified esters produced thereby can be utilized herein. Similarly, other esters of unsaturated fatty acids, for example, those prepared by the esterification of tall oil fatty acids with polyols, are also useful.

Also included within the terms "drying oil fatty acid esters" as set forth herein are alkyd resins prepared utilizing semi-drying or drying oils; esters of epoxides with such fatty acids, including esters of diglycidyl ethers of polyhydric compounds as well as other mono-, di-and polyepoxides, semi-drying or drying oil fatty acid esters of polyols, such as butanediol, trimethylolethane, trimethylolpropane, trimethylolhexane, pentaerythritol, and the like; and semi-drying or drying fatty acid esters of resinous polyols such as homopolymers or copolymers of unsaturated aliphatic alcohols, e.g., allyl alcohol or methallyl alcohol, including copolymers of such alcohols with styrene or other ethylenically unsaturated monomers or with non-oil modified alkyd resins containing free hydroxyl groups.

Any alpha, beta-ethylenically unsaturated dicarboxylic acid or anhydride can be employed to produce the reaction products described herein. These include such anhydrides as maleic anhydride, itaconic anhydride, and other similar anhydrides. Instead of the anhydride, there may also be used ethylenically unsaturated dicarboxylic acids which form anhydrides, for example, maleic acid or itaconic acid. These acids appear to function by first forming the anhydride. Fumaric acid, which does not form an anhydride, may also be utilized, although in many instances it requires more stringent conditions than the unsaturated dicarboxylic acid anhydrides or acids which form such anhydrides. Mixtures of any of the above acids or anhydrides may also be utilized. Generally speaking, the anhydride or acid employed contains from 4 to 12 carbon atoms, although longer chain compounds can be used if so desired.

While the reaction products can be comprised solely of adducts of the fatty acid ester and the dicarboxylic acid or anhydride, in many instances it is desirable to incorporate into the reaction product another ethylenically unsaturated monomer. The use of such monomer often produces films and coatings which are harder and more resistant to abrasion and which may have other similar desirable characteristics.

As shown in the art, it is preferred that in certain instances the neutralization reaction be carried out in such a manner that amido groups are attached to part of the carbonyl carbon atoms derived from the dicarboxylic acid or anhydride.

Compositions within this general class are described in U. S. Pats. Nos. 3,366,563 and 3,369,983.

Another vehicle comprises the fatty acid ester, unsaturated acid or anhydride reaction products and any additional unsaturated modifying materials (as described above) which are further reacted with the polyol.

Essentially any polyol can be employed, but diols are preferred. When higher polyols, such as trimethylolpropane, glycerol, pentaerythritol and the like are utilized, they are employed in small amounts, or in conjunction with the diol, or in the presence of a monohydric alcohol, and are used with adducts having a relatively low proportion of acidic component. Water-insoluble diols are often preferable, and especially desirable water-dispersed compositions for electrodeposition are obtained using 2,2-bis(4-hydroxycyclohexyl)propane (which has given the best results), neopentyl glycol, 1,1'-isopropylidene-bis(p-phenyleneoxy)di-2propanol, and similar diols.

The proportions of the polyol and ester-anhydride adduct which are employed depend upon various factors, but are in general limited only by the need to avoid gelation of the product. The total functionality of the reactants is a guide to determining the optimum proportions to be employed, and in most instances should not be greater than about 2.

In many instances, only part of the anhydride groups of the adduct, e.g., about 10 percent, are reacted with the polyol. Of those anhydride groups reacted, it is preferred that only one of the carboxyl groups is esterified in each instance.

The product contains a substantial part of the original acidity derived from the dicarboxylic acid or anhydride; ordinarily the product should have an acid number of at least about 20. To provide a water-dispersed product, such as is used in electrodeposition processes, at least part of the remaining acidic groups are neutralized by reaction of the partially esterified product with a base.

The polyol reaction products and reaction conditions are more fully described in Application Ser. No. 450,205, filed Apr. 22, 1965 now abandoned, as well as the art cited above.

Another type of electrodepositable coating composition which gives desirable results are the water-dispersible coating compositions comprising at least partially neutralized interpolymers of hydroxyalkyl esters of unsaturated carboxylic acid, unsaturated carboxylic acids and at least one other ethylenically unsaturated monomer. These are employed in the composition along with an amine-aldehyde condensation product, with the interpolymer usually making from about 50 percent to about 95 percent by weight of the resinous composition.

The acid monomer of the interpolymer is usually acrylic acid or methacrylic acid, but other ethylenically unsaturated monocarboxylic and dicarboxylic acids of up to about six carbon atoms can also be employed. The hydroxyalkyl ester is usually hydroxyethyl or hydroxypropyl acrylate or methacrylate, but also desirable are the various hydroxyalkyl esters of the above acids having, for example, up to about five carbon atoms in the hydroxyalkyl radical. Mono- or diesters of the dicarboxylic acids mentioned are included. Ordinarily, the acid and ester each comprise between about one percent and about 20 percent by weight of the interpolymer, with the remainder being made up of one or more other copolymerizable ethylenically unsaturated monomers. The most often used are the alkyl acrylates, such as ethyl acrylate; the alkyl methacrylates, such as methyl methacrylate; and the vinyl aromatic hydrocarbons, such as styrene, but others can be utilized.

The above interpolymer is at least partially neutralized by reaction with a base as described above; at least about 10 percent, and preferably 50 percent or more of the acidic groups are neutralized, and this can be carried out either before or after the incorporation of the interpolymer in the coating composition.

The amine-aldehyde condensation products included in these compositions are, for example, condensation products of melamine, benzoguanamine, or urea with formaldehyde, although other amine-containing amines and amides, including triazines, diazines, triazoles, guanadines, guanamines and alkyl and aryl-substituted derivatives of such compounds can be employed, as can other aldehydes, such as acetaldehyde. The alkylol groups of the products can be etherified by reaction with an alcohol, and the products utilized can be water-soluble or organic solvent-soluble.

Electrodeposition compositions comprising the above interpolymers and an amine-aldehyde resin are more fully described in U. S. Pat. No. 3,403,088.

Still another electrodepositable composition of desirable properties comprises an alkyd-amine vehicle, that is, a vehicle containing an alkyd resin and an amine-aldehyde resin. A number of these are known in the art and may be employed. Preferred are water-dispersible alkyds such as those in which a conventional alkyd (such as a glyceryl phthalate resin), which may be modified with drying oil fatty phthalate resin), which made with a high acid number (e.g., 50 to 70) and solubilized with ammonia or an amine, or those in which a surface active agent, such as a polyalkylene glycol (e.g., "Carbowax") is incorporated. High acid number alkyds are also made by employing a tricarboxylic acid, such as trimellitic acid or anhydride, along with a polyol in making the alkyd.

The above alkyds are combined with an amine-aldehyde resin, such as those described hereinabove. Preferred are water-soluble condensation products of melamine or a similar triazine with formaldehyde with subsequent reaction with an alkanol. An example of such a product is hexakis(methoxymethyl)melamine.

The alkyd-amine compositions are dispersed in water and they ordinarily contain from about 10 percent to about 50 percent by weight of amine resin based on the total resinous components.

Yet another electrodepositable composition of desirable properties comprises mixed esters of a resinous polyol. These resin esters comprise mixed esters of an unsaturated fatty acid adduct. Generally the polyols which are utilized with these resins are essentially any polyol having a molecular weight between about 500 and about 5,000. Such resinous polyols include those resinous materials containing oxirane rings which can be opened in, prior to, or during the esterification reaction to provide an apparent hydroxy site. The vehicle resins are formed by reacting a portion of the hydroxyl groups of the polyol with the fatty acid, the ratio of the reactions being such that at least an average of one hydroxyl group per molecule of the polyol remains unreacted. The remaining functionality is then reacted with the unsaturated fatty acid adduct of an olefinically unsaturated dicarboxylic anhydride, such as maleic anhydride, this second esterification reaction being conducted under conditions so that esterification occurs through the anhydride ring, thereby introducing free acid groups into the molecule. Mixed acids of the class described are disclosed in Belgian Pat. No. 641,642, as well as in copending Application Ser. No. 568,144, filed July 27, 1966 now abandoned.

In order to produce an electrodepositable composition, it is necessary to at least partially neutralize the acid groups present with a base in order to disperse the resin in the electrodeposition bath. Inorganic bases such as metal hydroxides, especially potassium hydroxide, can be used. There may likewise be used ammonia or organic bases, especially water-soluble amines, such as, for example, the mono-, di- and tri-lower alkyl amines such as methylamine, ethylamine, propylamine, butylamine, dimethylamine, diethylamine, dipropylamine, dibutyl-amine, and m-methyl-butylamine, triethylamine, tributylamine, methyldiethylamine, dimethyl-butylamine, and the like; cyclic amines such as morpholine, pyrrolidine, piperidine; diamines such as hydrozine, methylhydrazine, 2,3-toluene diamine, ethyl diamine and piperizine and substituted amines such as hydroxylamine, ethanolamine, diethanolamine, butanolamine, hexanolamine and methyl-diethanolamine, octanolamine, diglycolamine and other polyglycolamines, triethanolamine, and methylethanolamine, n-amino-ethanolamine and methyldiethanolamine and polyamines such as diethylene triamine.

There may be present in the electrodepositable composition any of the conventional types of pigments employed in the art. There is often incorporated into the pigment composition a dispersing or surface-active agent. Usually the pigment and surface-active agent, if any, are ground together in a portion of the vehicle, or alone, to make a paste and this is blended with the vehicle to produce a coating composition.

In many instances, it is preferred to add to the bath in order to aid dispersibility, viscosity and/or film quality, a non-ionic modifier or solvent. Examples of such materials are aliphatic, naphthenic and aromatic hydrocarbons or mixtures of the same; mono- and dialkyl ethers of glycols, pine oil and other solvents compatible with the resin system. The presently preferred modifier is 4-methyxy-4-methyl pentanone-2-(Pent-Oxone).

There may also be included in the coating composition, if desired, additives such as antioxidants. For example, orthoamylphenol or cresol. It is especially advantageous to include such antioxidants in coating compositions which are used in baths which may be exposed to atmospheric oxygen at elevated temperatures and with agitation over extended periods of time.

Other additives which may be included in coating compositions, if desired, include, for example, wetting agents such as petroleum sulfonates, sulfated fatty amines, or their amides, esters of sodium isothionates, alkyl phenoxypoly-ethylene alkanols, or phosphate esters including ethoxylated alkylphenol phosphates. Other additives which may be employed include anti-foaming agents, suspending agents, bactericides, and the like.

In formulating the coating composition, ordinary tap water may be employed. However, such water may contain a relatively high level of metals and cations which, while not rendering the process inoperative, may result in variations of properties of the baths when used in electrodeposition. Thus, in common practice, deionized water, i.e., water from which free ions have been removed by the passage through ion exchange resins, is invariably used to make up coating compositions of the instant invention.

In addition to the electrodepositable vehicle resins described above, there may be present in the electrodepositable composition other resinous materials which are non-carboxylic acid materials. For example, as shown above, there may be added up to about 50 percent by weight of an amine-aldehyde condensation product.

Other base-solubilized polyacids which may be employed as electrodeposition vehicles include those taught in U. S. Pat. No. 3,392,165, which is incorporated herein by reference, wherein the acid groups rather than being solely polycarboxylic acid groups contain mineral acid groups such as phosphonic, sulfonic, sulfate and phosphate groups.

The process of the instant invention is equally applicable to cationic type vehicle resins, that is, polybases solubilized by means of an acid, for example, an amine terminated polyamide or an acrylic polymer solubilized with acetic acid. Another case of such cationic polymers is described in copending application Ser. No. 772,366, filed Oct. 28, 1968 now abandoned.

In a manner similar to the anionic resins described above, the cationic resins may be formulated with adjuvants, such as pigments, solvents, surfactants, crosslinking resins, and the like.

The polyacids are anionic in nature and are dispersed or dissolved in water with alkaline materials such as amines or alkaline metal hydroxides and, when subjected to an electric current, they migrate to the anode. The polybasic resins, solubilized by acids, are cationic in character and when these resins are water-dispersed or solubilized with an acid such as acetic acid, the material deposits on the cathode under an electric current.

The invention is further described in conjunction with the following examples, which are to be considered illustrative rather than limiting. All parts and percentages in the examples and throughout this specification are by weight unless otherwise stated.

EXAMPLE I

The vehicle resin in this example is a maleinized tall oil fatty acid-adipic acid ester of a styrene-allyl alcohol copolymer of 1,100 molecular weight and 5 hydroxyl functionality comprising 39.8 percent of the copolymer, 52.9 percent tall oil fatty acids, 1.3 percent adipic acid and 6.0 percent maleic anhydride as a 90 percent solution in 4-methoxy-4-methyl pentanone-2 having an intrinsic viscosity of 31,500 centipoises and an acid value of 41. The electrodepositable material had the following composition.

| | | | |
|---|---|---|---|
| Non-Volatiles | | | 100% |
| Vehicle Non-volatiles: | | 86.05% | |
| 20% maleinized linseed oil | 5.05 | | |
| Vehicle resin (above) | 85.44 | | |
| Allyl ether of methlolated phenol (Methylon 75108) | 8.38 | | |
| Cresylic acid | 0.88 | | |
| Surfactant (Witco 912) | 0.25 | | |
| Pigment | | 13.95% | |
| Lead silicate | 4.15 | | |
| Manganese dioxide | 8.03 | | |
| Anthracite coal | 83.40 | | |
| Strontium chromate | 4.15 | | |
| Solubilizing amine - 1/4 diethyl/triethylamine | | | |

The composition was reduced to 12 percent solids with deionized water. The solvent comprised 2.6 percent of the total composition.

The bath treated in this example was the above composition after approximately 6 months aging and three turnovers.

This bath was subjected to selective filtration utilizing a Diaflow Membrane Ultrafilter PM 30 described above as Membrane A.

The bath was filtered by a batch process using membrane PM 30 at 50 p.s.i.

A 50 percent separation of that material was accomplished as follows:

1,000 parts of the above bath composition was subjected to ultrafiltration, removing 500 parts of ultrafiltrate. The 500 parts of ultrafiltrate was then stirred together with 50 parts IRC 50, a weak carboxylic acid-type ion exchange resin in hydrogen form.

|  | pH | Specific Conductivity (75°F.) | Milliequivalents of amine/100 gms. total |
|---|---|---|---|
| Before | 8.67 | 1470 | 2.50 |
| After | 4.67 | 730 | 0.75 |

The filtrate contained 0.4 percent suspended or dispersed solids.

Steel panels were then coated from the ultrafiltered bath material, rinsing the panels to remove dragout with the above ion-exchanged ultrafiltrate in such a manner that the rinse containing dragout returned to the electrodeposition bath. This was continued until all the ultrafiltrate had been utilized for rinsing.

The properties of the starting and reconstituted compositions were as follows:

|  | Starting Bath | Reconstituted Bath |
|---|---|---|
| pH | 8.5 | 8.45 |
| Solids | 11.3 | 10.9 |
| Conductivity 75°F. | 1740 | 1650 |
| Conductivity adjusted to 11.3% solids |  | 1710 |
| Percent Conductivity reduced |  | 1.7 |
| MEQ*/100 gm. total | 8.68 | 7.88 |
| Percent MEQ reduced |  | 9.2 |
| MEQ/100 gm. solid | 76.9 | 72.3 |
| Percent MEQ reduced |  | 6.0 |
| PPM $CO_2$ | 287 | 150 |
| Percent $CO_2$ reduced |  | 47.7 |

*MEQ = milliequivalents of amine

Phosphatized steel panels coated from the reconstituted bath at 250 volts for 2 minutes at a bath temperature of 75° F. had a slightly improved appearance over the acceptable appearance of panels coated under the same conditions from the starting bath. Panels rinsed with filtrate from the ion exchange step showed no significant difference from ones rinsed with deionized water. Salt spray tests on the panels were equivalent.

EXAMPLE II

The vehicle resin in this example is a maleinized tall oil fatty acid-adipic acid ester of a styrene-allyl alcohol copolymer of 1,100 molecular weight and 5 hydroxyl functionality comprising 39.8 percent of the copolymer, 52.9 percent tall oil fatty acids, 1.3 percent adipic acid and 6.0 percent maleic anhydride as an 80 percent solution in 4-methoxy-4-methyl pentanone-2 having an intrinsic viscosity of 4,000 centipoises and an acid number of 40. The electrodepositable material had the following composition:

|  | Parts by Weight |
|---|---|
| Vehicle resin above) (as solids) | 200.1 |
| 20 percent maleinized linseed oil | 7.8 |
| Surfactant (Witco 912) | 0.8 |
| 4-methoxy-4 methyl pentanone-2 | 50.1 |
| Cresylic acid | 2.1 |
| Diethylamine | 1.3 |
| Potassium hydroxide | 9.5 |
| Deionized water | 1697.0 |
| Red iron oxide | 4.6 |
| Anthracite coal | 15.5 |
| Amine modified clay (Bentone 11) | 0.5 |
| Strontium chromate | 3.1 |
| Basic lead silicate | 6.1 |
| Manganese dioxide | 1.5 |

2,000 parts of the above bath at 12 percent solids were subjected to a semi-continuous electrodeposition program as follows: Approximately 5 percent of the resin solids were coated on aluminum coil stock at 200 volts for five minutes with the bath temperature 75°–80° F. The coated aluminum coil stock was rinsed with 172 parts of ion-exchanged ultrafiltrate, as hereinafter described, so that the rinse water containing dragout was returned to the electrodeposition bath. After baking the aluminum strip was weighed, showing 11.8 parts of solids coated from the bath.

27 parts of a feed stock of the above bath composition at 43.8 percent (identical except for less water) were added to the bath to replace the solids removed. The bath was then in an excess base condition.

The bath was then subjected to ultrafiltration, utilizing the PM 50 membrane described above as Membrane A. 930 parts of ultrafiltrate was removed from the bath. The ultrafiltrate was then ion exchanged in a bath process utilizing one part of IRC 50, a weak carboxylic type ion exchange resin in the hydrogen form to each 10 parts of ultrafiltrate and stirring for ½ hour.

The properties of the ultrafiltrate were as follows:

|  | pH | Specific conductivity (75°F.) | Milliequivalents of amine/100 gm. total |
|---|---|---|---|
| Before exchange | 8.6 | 890 | 1.20 |
| After exchange | 4.6 | 280 | 0.27 |

These values remained approximately constant in each stage of the run.

Again approximately 5 percent of the solids were coated from the water as above. The coated stock was rinsed with approximately 200 parts of ion exchanged ultrafiltrate, the rinse returning to the bath. The remaining ion exchanged ultrafiltrate was returned directly to the bath. The solids were again replenished with 43.8 percent solids concentrate and the bath ultrafiltered and the ultrafiltrate ion exchanged.

The entire procedure was repeated in essentially identical manner a total of four times. At the end of these cycles the paint properties compared as follows:

|  | Original Paint | Processed Paint |
|---|---|---|
| pH | 8.85 | 8.6 |
| Conductivity 75°F. | 2300 | 1750 |
| MEQ/100 gm. solids | 71.0 | 71.0 |
| % Solids | 12.15 | 9.72 |

The loss of solids is apparently attributable to equipment transfer losses which, if desired, could be eliminated or minimized, especially in a continuous process. The bath, when constituted to original solids with the 43.8 percent feed material showed pH conductivity and MEQ value equivalent to the original bath. The process showed total MEQ control and allowed essentially total recovery of dragout. The original and processed paints both yielded 0.6 mil films when coated at 260 volts for 2 minutes at 75° F. Film appearance was equivalent. Salt spray and saponification resistance tests gave equivalent results.

Other electrodepositable compositions, such as those hereinabove described, can be substituted for those exemplified. Likewise, various ultrafilter ion exchange resins and method variations may be employed to obtain the improvements hereinabove described.

We claim
1. A method of operating an electrodeposition process wherein an electrically conductive article is electrocoated from an electrodeposition bath comprising synthetic resin ionically dispersed in an aqueous medium which comprises subjecting at least a portion of the electrodeposition bath to an ultrafiltration process wherein the ultrafiltration membrane retains said dispersed resin and passes water and solute of substantially lower molecular size than said resin, returning retentate from the ultrafiltration process to the electrodeposition bath and contacting the resultant ultrafiltrate with an ion exchange resin for a time sufficient to adjust the PH of said ultrafiltrate.

2. A method as in claim 1 wherein the ultrafiltration process is operated at a pressure gradient between about 10 and about 150 p.s.i. and wherein the ultrafiltration membrane has a flux rate of at least about 4.5 gallons per square foot per day.

3. A method as in claim 2 wherein the resin is an acid-solubilized synthetic polybasic resin and the ion exchange resin is an anion-exchange resin.

4. A method as in claim 2 wherein the electrodeposition bath has been previously utilized to electrocoat articles.

5. A method as in claim 4 wherein a portion of the solubilized counter-ion is removed from the electrodeposition bath.

6. A method as in claim 2 wherein the resin is a base-solubilized polyacid resin and the ion exchange resin is a cation-exchange resin.

7. A method as in claim 6 wherein the resin is a synthetic polycarboxylic acid resin.

8. A method as in claim 7 wherein the ultrafiltration process is operated at a pressure gradient between about 10 and about 150 p.s.i. and wherein the ultrafiltration membrane has a flux rate of at least about 4.5 gallons per square foot per day.

9. A method as in claim 8 wherein the electrodeposition bath has been previously utilized to electrocoat articles.

10. A method as in claim 9 wherein at least a portion of the excess base is removed from the electrodepositable composition.

11. A method as in claim 9 wherein the cation exchange resin contains carboxylic acid groups as the functional site.

12. A method as in claim 10 wherein the base is potassium hydroxide.

13. In an electrodeposition process wherein an electrically conductive article is electrocoated in an electrodeposition bath comprising a synthetic resin ionically dispersed in an aqueous medium, and subsequently rinsed, the improvement comprising subjecting at least a portion of the electrodeposition bath to an ultrafiltration process wherein the ultrafiltration membrane retains said dispersed resin and passes water and solute of substantially lower molecular size than said resin, returning retentate from the ultrafiltration process to the electrodeposition bath, contacting the resultant ultrafiltrate with an ion exchange resin for a time sufficient to adjust the pH of said ultrafiltrate and utilizing the resultant liquid as at least a portion of the rinsing agent.

14. A method as in claim 13 wherein the resin is an acid-solubilized synthetic polybasic resin and the ion-exchange resin is an anion-exchange resin.

15. A method as in claim 13 wherein the electrodeposition bath has been previously utilized to electrocoat articles.

16. A method as in claim 13 wherein the rinsing is conducted in such a manner that rinsing removes dragout and the dragout-containing rinse agent returns to the electrodeposition bath.

17. A method as in claim 13 wherein a portion of the solubilizing counter-ion is removed from the electrodeposition bath.

18. A method as in claim 13 wherein the resin is a base-solubilized synthetic polyacid resin and the ion exchange resin is a cation exchange resin.

19. A method as in claim 18 wherein the ultrafiltration process is operated at a pressure gradient between about 10 and about 150 p.s.i. and wherein the ultrafiltration membrane has a flux rate of at least about 4.5 gallons per square foot per day.

20. A method as in claim 19 wherein the rinsing is conducted in such a manner that rinsing removes dragout and the dragout-containing rinse agent returns to the electrodeposition bath.

* * * * *